(12) United States Patent
Edamura et al.

(10) Patent No.: US 11,067,728 B2
(45) Date of Patent: Jul. 20, 2021

(54) MOVABLE DIFFRACTION GRATING, EXTERNAL-RESONATOR LASER MODULE, AND MANUFACTURING METHOD FOR MOVABLE DIFFRACTION GRATING

(71) Applicant: HAMAMATSU PHOTONICS K.K., Hamamatsu (JP)

(72) Inventors: Tadataka Edamura, Hamamatsu (JP); Atsushi Sugiyama, Hamamatsu (JP); Tatsuo Dougakiuchi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 332 days.

(21) Appl. No.: 16/285,426

(22) Filed: Feb. 26, 2019

(65) Prior Publication Data

US 2019/0265396 A1 Aug. 29, 2019

(30) Foreign Application Priority Data

Feb. 28, 2018 (JP) .............................. JP2018-035441

(51) Int. Cl.
*G02B 5/18* (2006.01)

(52) U.S. Cl.
CPC ......... *G02B 5/1861* (2013.01); *G02B 5/1857* (2013.01)

(58) Field of Classification Search
CPC .......................... G02B 5/1861; G02B 5/1857
See application file for complete search history.

(56) References Cited

U.S. PATENT DOCUMENTS

2016/0105090 A1\* 4/2016 Sadaharu ........... G02B 26/0841
310/38

FOREIGN PATENT DOCUMENTS

JP 5351729 B2 11/2013

OTHER PUBLICATIONS

Hayazaki, "MEMS Optical Scanner", JP2009275850, machine translation (Year: 2009).\*

\* cited by examiner

*Primary Examiner* — Wen Huang
(74) *Attorney, Agent, or Firm* — Faegre Drinker Biddle & Reath LLP

(57) ABSTRACT

A movable diffraction grating includes; a supporting portion; a movable portion which includes a first surface and is swingably connected with the supporting portion; a resin layer which is provided on the first surface and includes a diffraction grating pattern formed therein; a reflection layer which is provided on the resin layer an along the diffraction grating pattern and is formed of metal; and a stress regulation portion inducing stress on the movable portion, and the first surface is caused to bend concavely by stress.

16 Claims, 12 Drawing Sheets

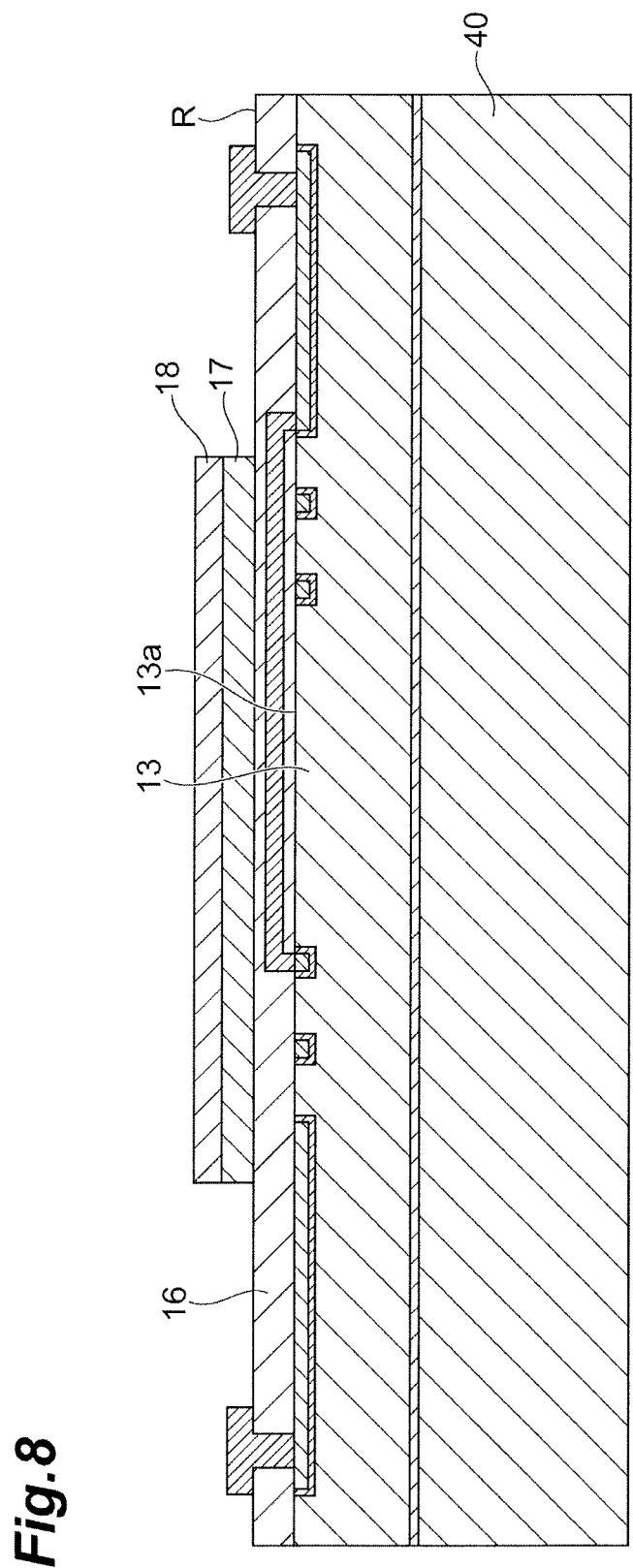

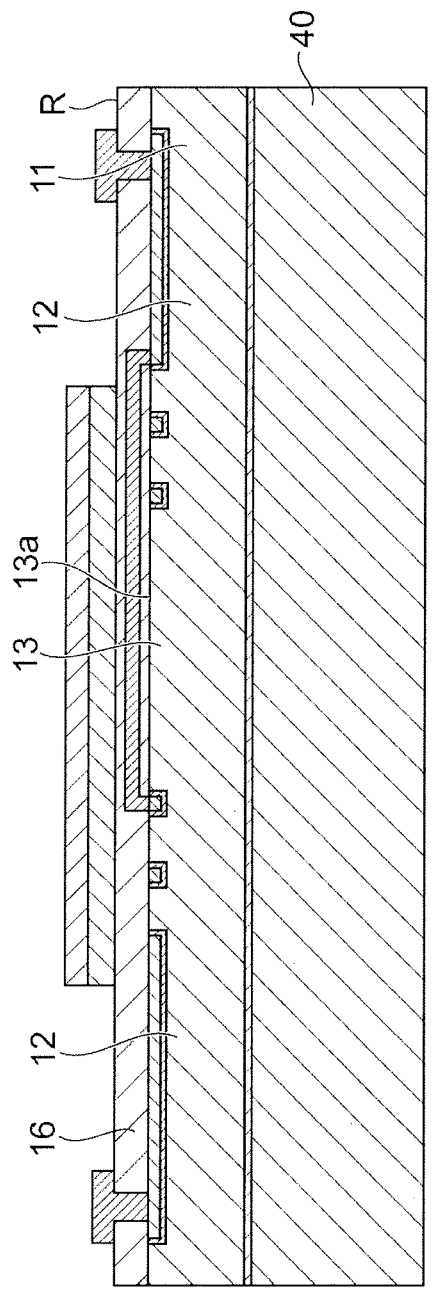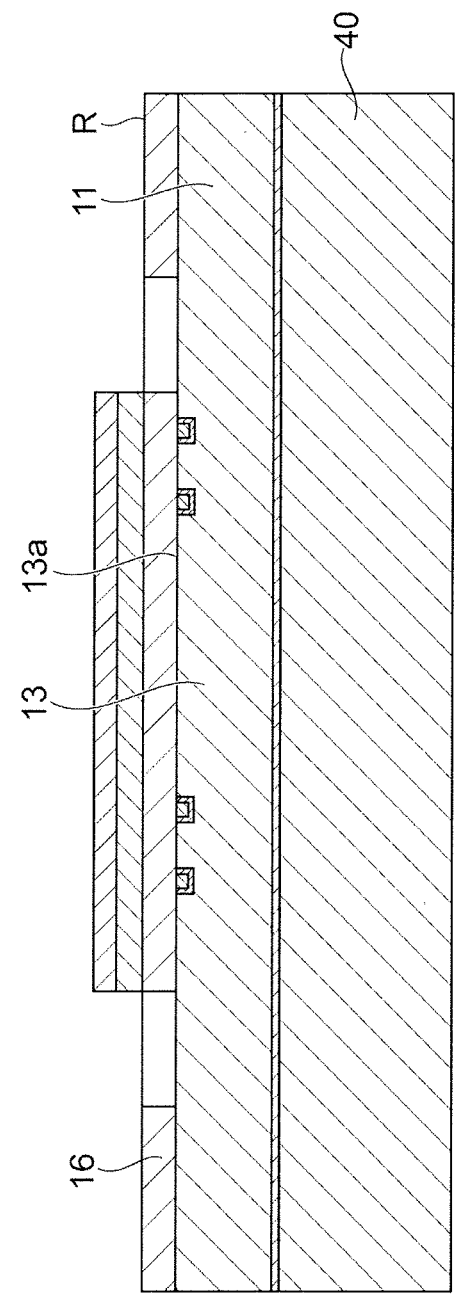

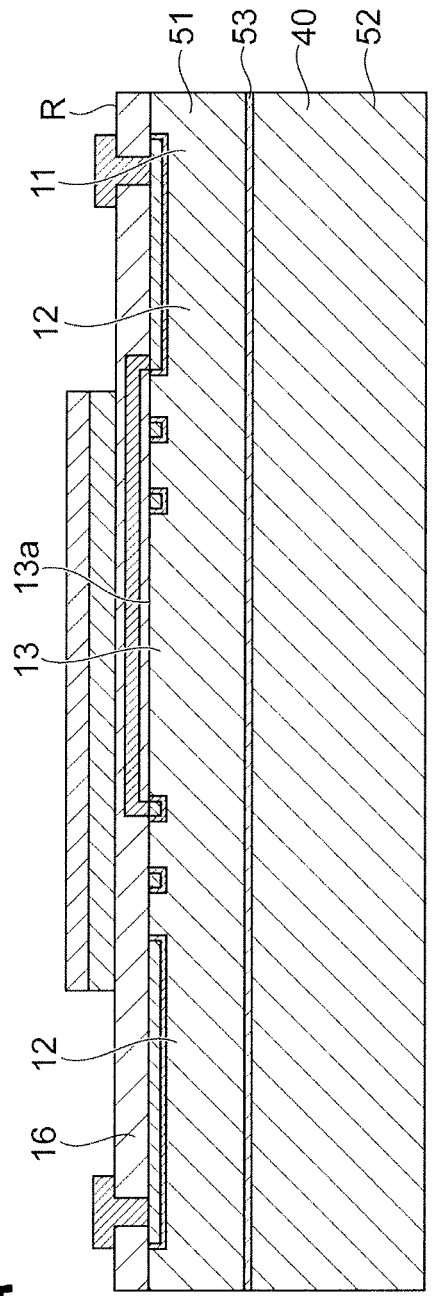
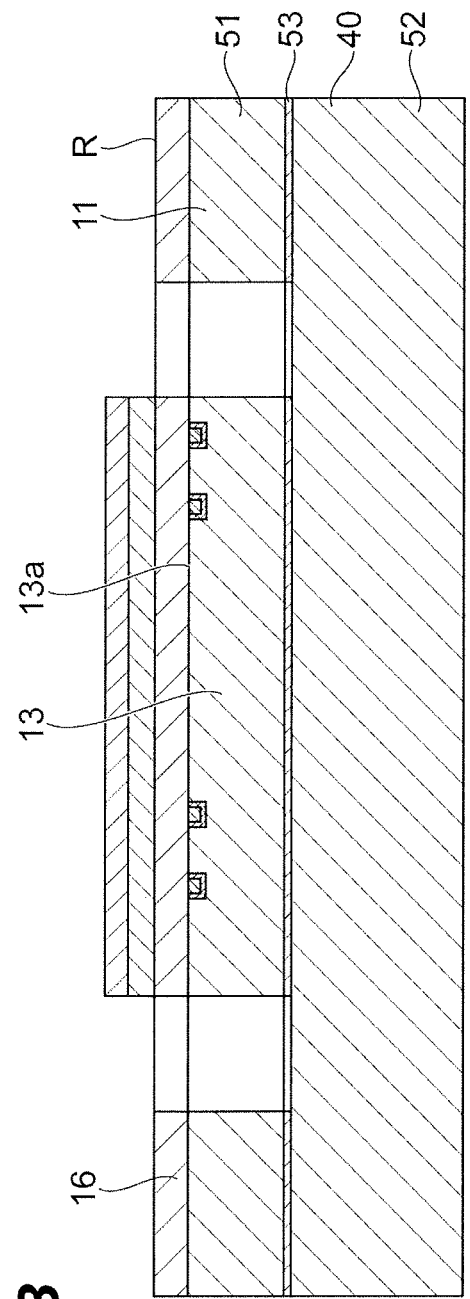
Fig.10A
Fig.10B

MOVABLE DIFFRACTION GRATING, EXTERNAL-RESONATOR LASER MODULE, AND MANUFACTURING METHOD FOR MOVABLE DIFFRACTION GRATING

TECHNICAL FIELD

An aspect of the present disclosure relates to a movable diffraction grating which is formed as a device of Micro Electro Mechanical Systems (MEMS), for example, an external-resonator laser module including the foregoing movable diffraction grating, and a manufacturing method for the foregoing movable diffraction grating.

BACKGROUND

Japanese Patent No. 5351729 describes, as a device of MEMS, a movable diffraction grating including a supporting portion, a movable portion swingably connected with the supporting portion, and a metal film provided on the movable portion and including a diffraction grating pattern formed therein. In such a movable diffraction grating as described, the movable portion is caused to swing fast at a level of a resonance frequency thereof, for example.

SUMMARY

In the above-described movable diffraction grating, it is conceivable to provide a resin layer on the movable portion and form a diffraction grating pattern in the resin layer, in order to improve flexibility in design of the diffraction grating pattern. However, in such a configuration, incident light cannot be accurately diffracted and reflected, in some cases.

In view of this, it is an object of an aspect of the present disclosure to provide a movable diffraction grating which can accurately diffract and reflect incident light, an external-resonator laser module including the foregoing movable diffraction grating, and a manufacturing method for the foregoing movable diffraction grating.

A movable diffraction grating according to an aspect of the present disclosure includes: a supporting portion; a movable portion which includes a first surface and is swingably connected with the supporting portion; a resin layer in which a diffraction grating pattern is formed, the resin layer being provided on the first surface; a reflection layer which is provided on the resin layer and along the diffraction grating pattern and is formed of metal; and a stress regulation portion which induces stress on the movable portion, wherein the first surface is caused to bend concavely by the stress.

In a case where a resin layer is provided on a movable portion, the resin layer may have a shape which bends in various ways due to stress generated in the resin layer itself, influences of a base layer, and the like, in some cases. In such cases, a reflection layer on the resin layer has also a bending shape and cannot accurately diffract and reflect incident light. If such a movable diffraction grating is used as an external resonator of an external-resonator laser module, for example, an efficiency of diffraction may be reduced. In contrast, in this movable diffraction grating, the stress regulation portion which induces stress on the movable portion is provided, and the first surface is caused to bend concavely by the stress. Accordingly, the resin layer provided along the first surface can be certainly formed into a concavely-bending shape. As a result of this, incident light can be accurately diffracted or reflected, and it is possible to suppress reduction of an efficiency of diffraction in a case where this movable diffraction grating is used as an external resonator of an external-resonator laser module, for example.

In the movable diffraction grating according to an aspect of the present disclosure, the stress regulation portion may be provided in a form of layer on a second surface that is opposed to the first surface. In this case, stress can be more preferably induced on the movable portion.

In the movable diffraction grating according to an aspect of the present disclosure, the stress regulation portion may include a first layer provided on a second surface that is opposed to the first surface, and a second layer provided on the first layer. In this case, stress can be much more preferably induced on the movable portion.

In the movable diffraction grating according to an aspect of the present disclosure, each of the first layer and the second layer may be an oxide film. In this case, the second layer can be formed uniformly on the first layer.

In the movable diffraction grating according to an aspect of the present disclosure, stress per unit thickness that is induced on the movable portion by the first layer may be larger than stress per unit thickness that is induced on the movable portion by the second layer. In this case, by formation of the second layer on the first layer, a magnitude of stress induced on the movable portion can be easily and certainly regulated, and consequently, the first surface can be easily and certainly caused to bend in a desired concave form.

In the movable diffraction grating according to an aspect of the present disclosure, the diffraction grating pattern may be a blazed grating pattern including a plurality of grooves each of which extends along a direction parallel to a center line on which the movable portion swings. The movable diffraction grating configured in this manner can be more preferably used in an external-resonator laser module.

The movable diffraction grating according to an aspect of the present disclosure may further include a torsion bar extending along the center line and connecting the supporting portion and the movable portion with each other. The movable diffraction grating configured in this manner can be much more preferably used in an external-resonator laser module.

In the movable diffraction grating according to an aspect of the present disclosure, the first surface may be caused to bend concavely in a first cross section orthogonal to a center line on which the movable portion swings. The movable diffraction grating configured in this manner can be much more preferably used in an external-resonator laser module.

In the movable diffraction grating according to an aspect of the present disclosure, the first surface may be caused to bend concavely in a second cross section orthogonal to the first cross section. The movable diffraction grating configured in this manner can be much more preferably used in an external-resonator laser module.

In the movable diffraction grating according to an aspect of the present disclosure, the movable portion may have a circular shape when seen from a direction orthogonal to the first surface. In this case, the first surface can be easily and certainly caused to bend in a desired concave form.

In the movable diffraction grating according to an aspect of the present disclosure, a second surface that is opposed to the first surface may be caused to bend convexly by the stress induced by the stress regulation portion. In this case, the first surface can be easily and certainly caused to bend in a desired concave form.

An external-resonator laser module according to an aspect of the present disclosure, includes the above-described movable diffraction grating, and a laser element, wherein the movable diffraction grating which diffracts and reflects light oscillated by the laser element so that light of a specific wavelength in the light is returned back to the laser element. In this external-resonator laser module, the movable diffraction grating functions as an external resonator, so that light of a specific wavelength can be amplified and output to the outside. Further, by causing the movable portion of the movable diffraction grating to swing and changing an orientation of a grating surface, it is possible to change a wavelength of output light quickly. Accordingly, to use this external-resonator laser module as a light source for analysis of a concentration of a gas, for example, makes it possible to analyze various kinds of gases with a single light source, and shorten a time for analysis.

A manufacturing method for a movable diffraction grating according to an aspect of the present disclosure is a manufacturing method for the above-described movable diffraction grating, the method including: a first step of preparing a substrate including a portion corresponding to the supporting portion and the movable portion, and forming the resin layer and the reflection layer; and a second step of forming the stress regulation portion and inducing the stress on the movable portion, to cause the first surface to bend concavely, after the first step. In this manufacturing method for the movable diffraction grating, because the stress regulation portion is formed and the first surface is caused to bend concavely after formation of the resin layer and the reflection layer, the first surface can be certainly caused to bend in a desired concave form.

In the manufacturing method for the movable diffraction grating according to an aspect of the present disclosure, in the second step, at least a part of the stress regulation portion may be formed by sputtering. In this case, a high-density stress regulation portion can be formed, and stress can be more preferably induced on the movable portion. Further, because sputtering can be performed at a low temperature, influences of formation of the stress regulation portion upon the resin layer can be reduced.

In the manufacturing method for the movable diffraction grating according to an aspect of the present disclosure, the substrate may include a semiconductor layer and an insulating layer, and in the second step, etching may be performed in such a manner that a part of the insulating layer is left and the rest of the insulating layer is removed, so that at least a part of the stress regulation portion is formed. In this case, it is possible to form the stress regulation portion by leaving a part of the insulating layer included in the substrate.

In the manufacturing method for the movable diffraction grating according to an aspect of the present disclosure, in the second step, the semiconductor layer may be etched by using the insulating layer as an etching stop layer. In this case, by causing the insulating layer to function as an etching stop layer, it is possible to preferably etch the semiconductor layer. Further, it is possible to form the stress regulation portion by leaving a part of the insulating layer functioning as an etching stop layer.

According to an aspect of the present disclosure, a movable diffraction grating which can accurately diffract and reflect incident light, an external-resonator laser module including the foregoing movable diffraction grating, and a manufacturing method for the foregoing movable diffraction grating, can be provided.

BRIEF DESCRIPTION OF THE DRAWINGS

FIG. 8 is a view for explaining the manufacturing method for the movable diffraction grating shown in FIG. 2.

FIGS. 9A and 9B are views for explaining the manufacturing method for the movable diffraction grating shown in FIG. 2.

FIGS. 10A and 10B are views for explaining the manufacturing method for the movable diffraction grating shown in FIG. 2.

DETAILED DESCRIPTION

Hereinafter, an embodiment of the present disclosure will be described in detail with reference to the drawings. It is noted that in the following description, the same reference signs will be used for the same or corresponding elements, and duplicated description will be omitted.

[Configuration of External-Resonator Laser Module]

Figure 1:
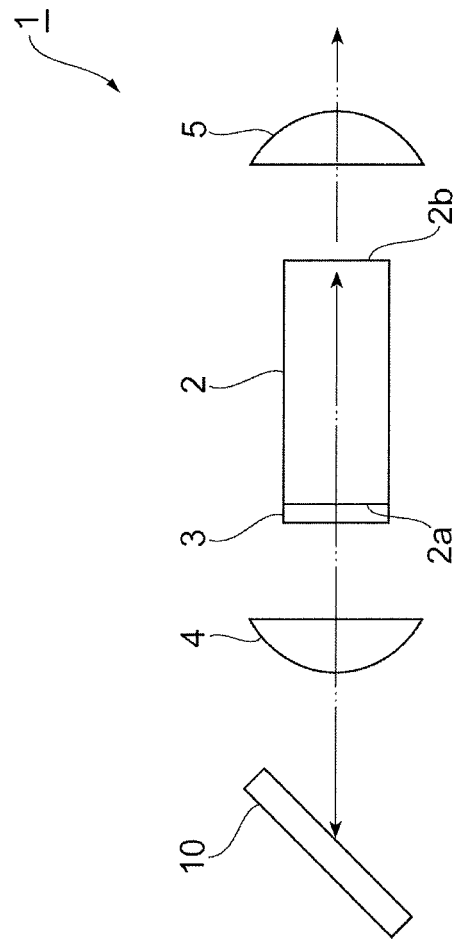
FIG. 1 shows a configuration of an external-resonator laser module according to an embodiment.

As shown in FIG. 1, an external-resonator laser module 1 includes a quantum cascade laser element 2, a reflection reduction film 3, a lens 4, a lens 5, and a movable diffraction grating 10.

The quantum cascade laser element 2 includes a first end face 2a and a second end face 2b which are opposed to each other, and emits wide-band (4 μm or more and 16 μm or less, for example) light in a mid-infrared region from each of the first end face 2a and the second end face 2b. The quantum cascade laser element 2 has a structure in which a plurality of active layers having different center wavelengths are put on one another in a stack form, and can emit such wide-band light as described above. The quantum cascade laser element 2 may have a structure including a single layer, and also in this case, the quantum cascade laser element 2 can emit such wide-band light as described above.

The reflection reduction film 3 which reduces reflectance of the first end face 2a is provided on the first end face 2a, and the first end face 2a transmits light which travels within the quantum cascade laser element 2 and is incident upon the first end face 2a. The second end face 2b reflects a part of light which travels within the quantum cascade laser element 2 and is incident upon the second end face 2b, and transmits the rest of the light. Though the second end face 2b is exposed to the outside in the present embodiment, a reflection reduction film which reduces reflectance of the second end face 2b may be provided on the second end face 2b.

The lens 4 collimates light emitted from the first end face 2a. The lens 5 collimates light emitted from the second end face 2b. Light collimated by the lens 5 is output to the outside of the external-resonator laser module 1, as output light.

Light collimated by the lens 4 is incident upon the movable diffraction grating 10. The movable diffraction grating 10 diffracts and reflects the incident light, so that light of a specific wavelength in the incident light is returned back to the first end face 2a of the quantum cascade laser element 2. That is, the movable diffraction grating 10 and the second end face 2b form a Littrow external resonator. Thus, the external-resonator laser module 1 can amplify light of a specific wavelength and output the resultant light to the outside.

Further, in the movable diffraction grating 10, an orientation of a grating surface can be changed quickly as described later. Accordingly, a wavelength of light which is returned back to the first end face 2a of the quantum cascade laser element 2 from the movable diffraction grating 10 is made variable, which in turn makes a wavelength of output light of the external-resonator laser module 1 variable. The external-resonator laser module 1 having the above-described configuration is used for analyzing concentrations of various gases based on absorption of light of wavelengths in a mid-infrared region, for example.

[Configuration of Movable Diffraction Grating]

Figure 2:
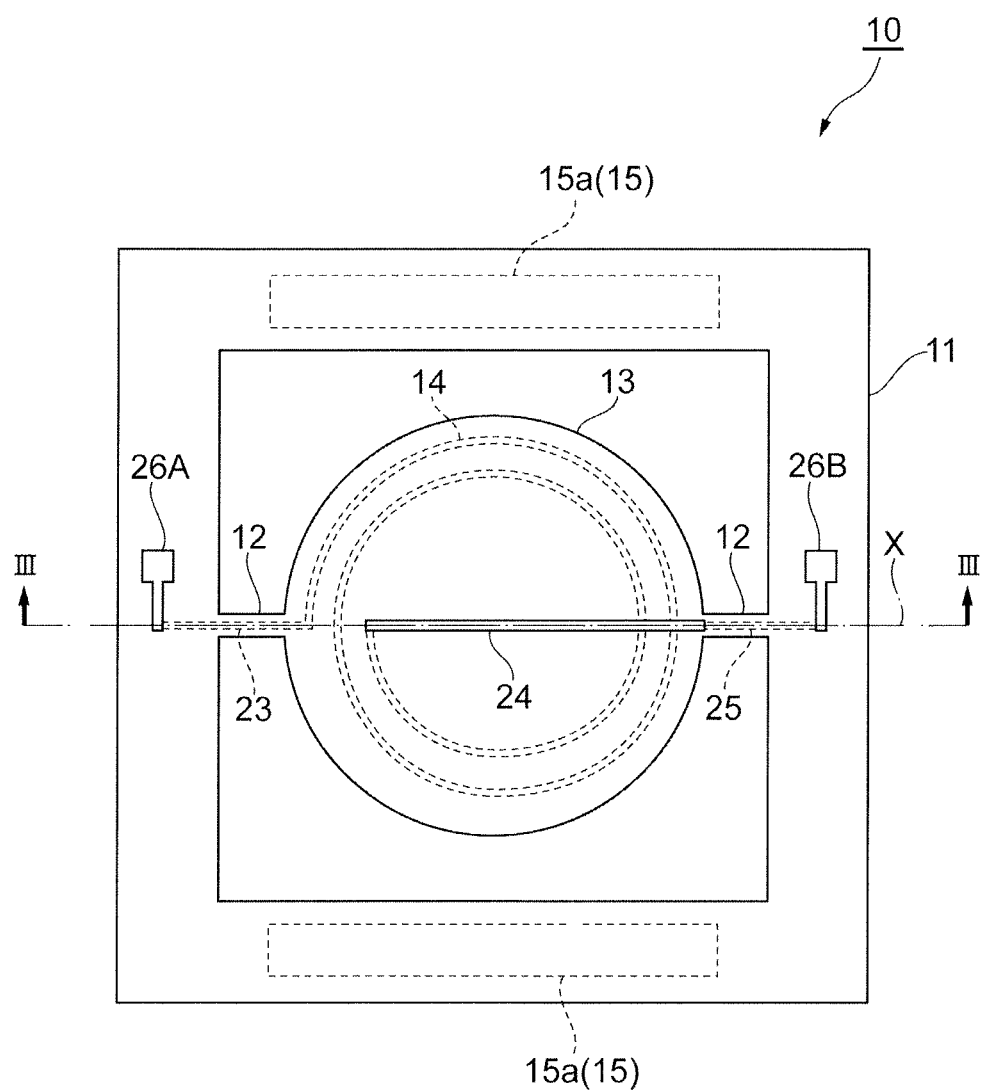
FIG. 2 shows a circuit configuration of a movable diffraction grating shown in FIG. 1.
Figure 3:
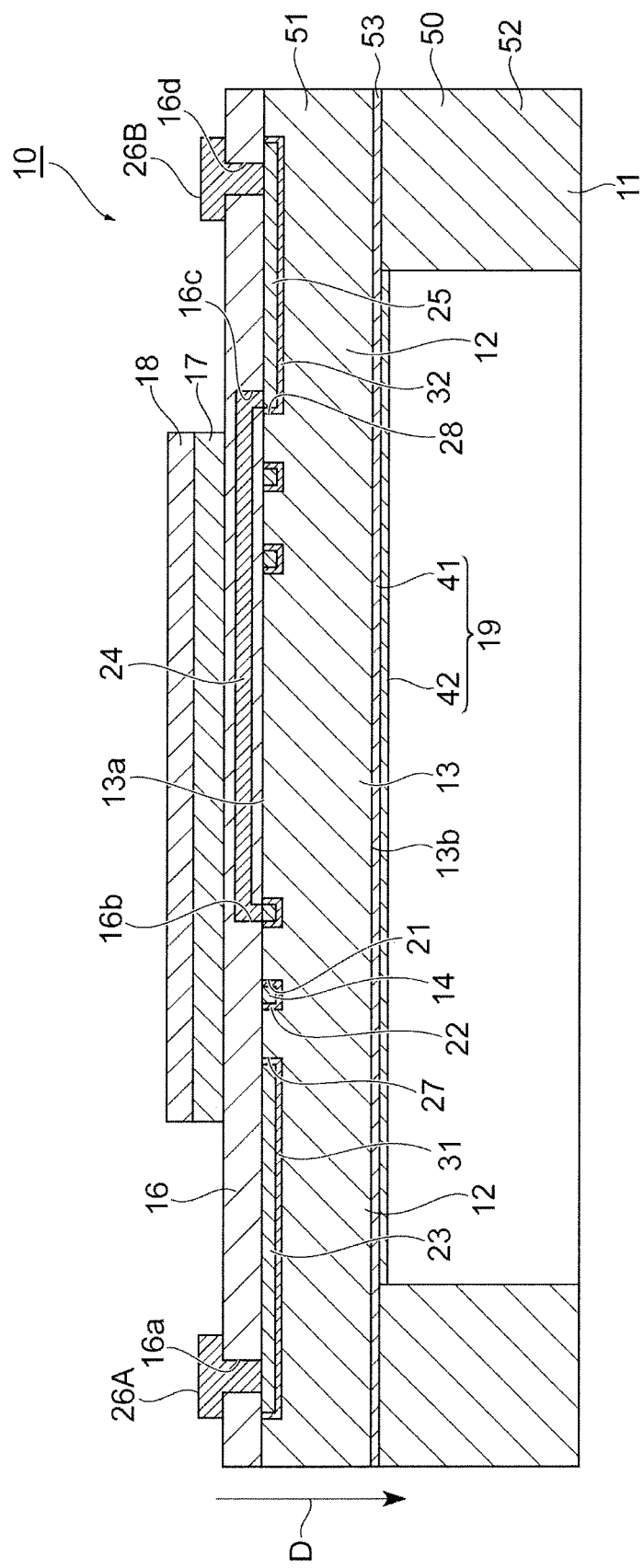
FIG. 3 is a sectional view taken along a line III-III in FIG. 2.

With reference to FIGS. 2 and 3, the movable diffraction grating 10 will be further described. The movable diffraction grating 10 includes a supporting portion 11, a pair of torsion bars 12, a movable portion 13, a coil 14, a magnetic-field generation portion 15, an insulating layer 16, a resin layer 17, a reflection layer 18, and a stress regulation portion 19. The movable diffraction grating 10 is formed as a device of MEMS which allows the movable portion 13 to swing on a center line X. Though the movable portion 13, the insulating layer 16, the resin layer 17, the reflection layer 18, and the stress regulation portion 19 are schematically represented in a flat shape in FIGS. 2 and 3, those elements bend concavely actually as described later.

The supporting portion 11 is a flat-plate-shaped frame which has a rectangular shape in a plan view (when seen from a direction orthogonal to a first surface 13a of the movable portion 13). The supporting portion 11 supports the movable portion 13 and the like via the pair of torsion bars 12. The pair of torsion bars 12 are respectively placed on opposite sides of the movable portion 13 in the center line X. Each of the torsion bars 12 extends along the center line X, and connects the supporting portion 11 and the movable portion 13 with each other so that the movable portion 13 can swing on the center line X.

The movable portion 13 is a plate-shaped member which has a circular shape in a plan view, and is located on an inner side of the supporting portion 11. The movable portion 13 includes the first surface 13a and a second surface 13b which are opposed to each other. The movable portion 13 is swingably connected with the supporting portion 11 via the torsion bars 12, as described above. The supporting portion 11, the torsion bars 12, and the movable portion 13 are incorporated into one substrate 50, so that they are integrally formed.

The substrate 50 includes semiconductor layers 51 and 52, and an insulating layer 53 interposed between the semiconductor layers 51 and 52. The substrate 50 is an SOI substrate, for example. In this case, the semiconductor layers 51 and 52 are formed of silicon (Si), and the insulating layer 53 is formed of a silicon oxide film ($SiO_2$). The insulating layer 53 is a silicon oxide film formed by thermal oxidation of silicon, for example. A thickness of the semiconductor layer 51 is approximately 60 µm, for example. A thickness of the semiconductor layer 52 is approximately 400 µm, for example. A thickness of the insulating layer 53 is approximately 1 µm, for example.

The supporting portion 11 is formed of the semiconductor layers 51 and 52 and the insulating layer 53. Each of the torsion bars 12 and the movable portion 13 is formed of the semiconductor layer 51. Portions of the insulating layer 53, the portions being located on the torsion bars 12 and the movable portion 13, form a first layer 41 of the stress regulation portion 19 as described later.

The coil 14 is buried in a groove 21 formed in the first surface 13a of the movable portion 13. An insulating layer 22 formed of a silicon oxide film, for example, is provided on an inner surface of the groove 21. The coil 14 is formed by plating copper (Cu) on the insulating layer 22, for example. The coil 14 is wound plural times in a spiral form in a plan view.

An outer end of the coil 14 is electrically connected with one end of a wire 23. An inner end of the coil 14 is electrically connected with one end of a wire 24. The other end of the wire 23 is electrically connected with an electrode 26A provided in the supporting portion 11. The other end of the wire 24 is electrically connected with an electrode 26B provided in the supporting portion 11, via a wire 25. Each of the electrodes 26A and 26B is electrically connected with a control circuit or the like.

The wire 23 is buried in a groove 27 which is formed over surfaces of the supporting portion 11, one of the torsion bars 12, and the movable portion 13. The groove 27 is connected with the groove 21 at a connecting part of the coil 14 and the wire 23. The wire 24 is provided in the insulating layer 16, goes above the coil 14, and crosses the coil 14 in three dimensions. The wire 25 is buried in a groove 28 which is formed over surfaces of the supporting portion 11, the other of the torsion bars 12, and the movable portion 13. The wires 23 and 25, like the coil 14, are placed in the grooves 27 and 28 with insulating layers 31 and 32 interposed therebetween, respectively.

The magnetic-field generation portion 15 causes a magnetic field to act on the coil 14. The magnetic-field generation portion 15 is formed of a permanent magnet, for example. The magnetic-field generation portion 15 includes a permanent magnet which is placed on a wiring board of resin, for example, and the supporting portion 11 is placed on the wiring board. The pair of torsion bars 12 and the movable portion 13 are placed so as to be separated from the wiring board. The magnetic-field generation portion 15 includes a pair of portions 15a, 15a which respectively faces a pair of side portions of the supporting portion 11, the side portions extending in parallel with the center line X. Magnetic poles in the magnetic-field generation portion 15 are arranged in Halbach array, for example.

The coil 14 and the magnetic-field generation portion 15 form a driving portion which causes the movable portion 13 to swing. In the movable diffraction grating 10, when a current flows through the coil 14, due to a magnetic field induced on the magnetic-field generation portion 15, Lorentz force is exerted on electrons flowing through the coil 14 in a predetermined direction. Accordingly, the coil 14 becomes subjected to a force in the predetermined direction. Thus, by controlling a direction or a magnitude of a current flowing through the coil 14, it is possible to cause the movable portion 13 to swing on the center line X. Further, by feeding a current at a frequency corresponding to a resonance frequency of the movable portion 13 through the coil 14, it is possible to cause the movable portion 13 to swing fast at a level of a resonance frequency.

As shown in FIG. 3, the insulating layer 16 is provided over surfaces of the supporting portion 11, the pair of torsion bars 12, and the movable portion 13 in such a manner that the coil 14 and the wires 23 and 25 are covered. That is, the insulating layer 16 is provided on the first surface 13a of the movable portion 13. The insulating layer 16 is a silicon oxide film, for example. Each of the electrodes 26A and 26B is provided in a portion of the insulating layer 16, the portion being located on the supporting portion 11.

In the insulating layer 16, openings 16a to 16d are provided. The wire 23 and the electrode 26A are electrically connected with each other via the opening 16a. The wire 24 and the coil 14 are electrically connected with each other via the opening 16b. The wire 24 and the wire 25 are electrically connected with each other via the opening 16c. The wire 25 and the electrode 26B are electrically connected with each other via the opening 16d.

The resin layer 17 is provided on a portion of the insulating layer 16, the portion being located on the movable portion 13. That is, the resin layer 17 is provided on the first surface 13a of the movable portion 13 with the insulating layer 16 interposed therebetween. The resin layer 17 is provided on the first surface 13a so as to lie along the first surface 13a. The resin layer 17 is provided on a whole surface of an area of the movable portion 13, the area being overlapped by the resin layer 17 in a plan view, for example. It is preferable that the resin layer 17 is formed of a material which has lower thermal conductivity than that of a material forming the substrate 50. As a material forming the resin layer 17, an ultraviolet curable resin such as CELVENUS LU1303HA (manufactured by DAICEL CORPORATION) is cited, for example. In a surface of the resin layer 17, the surface being on a side opposite to the insulating layer 16, a diffraction grating pattern 35 is formed.

Figure 4:
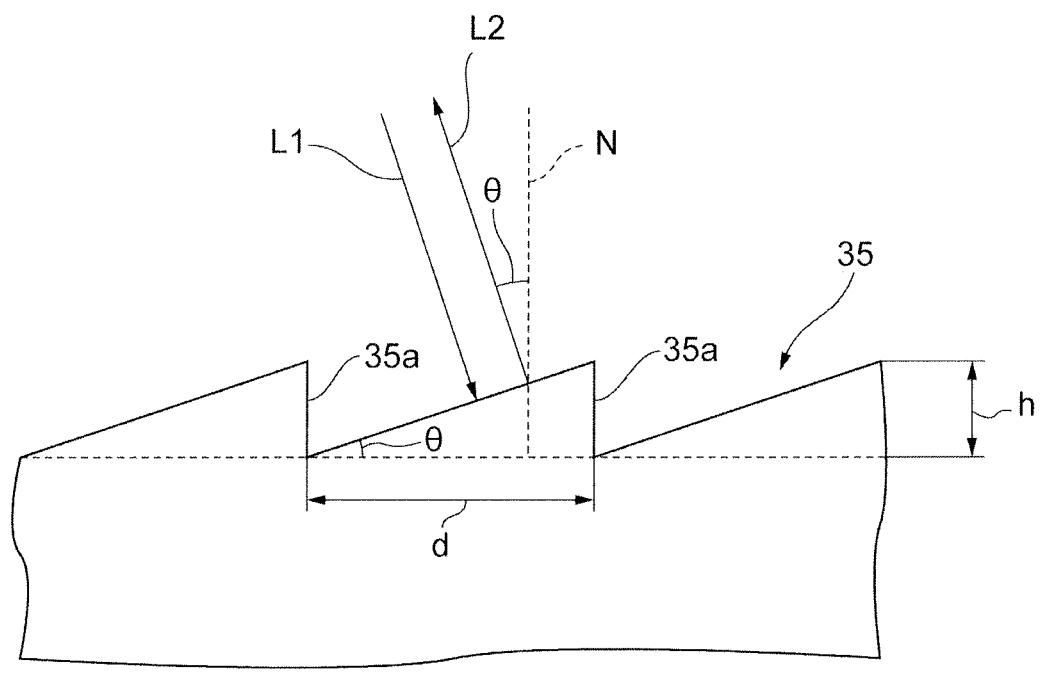
FIG. 4 shows a diffraction grating pattern.

FIG. 4 shows the diffraction grating pattern 35 when seen from a direction parallel to the center line X. As shown in FIG. 4, the diffraction grating pattern 35 is, for example, a blazed grating pattern having a sawtooth cross section, and includes a plurality of grooves 35a each extending along a direction parallel to the center line X. The plurality of grooves 35a is arranged along a direction orthogonal to the center line X.

In a case where the movable diffraction grating 10 is used as a Littrow external resonator as in the present embodiment, diffracted light L2 is reflected in a direction opposite to a direction in which incident light L1 comes. In the diffraction grating pattern 35, a blazed angle θ which is an angle of the groove 35a with respect to a normal direction N of a grating surface is expressed by the following formula (1) using a diffraction order m, a wavelength λ of incident light, and a groove-to-groove distance d. In the case of a Littrow type, the diffraction order m is one.

$$\sin \theta = m\lambda/2d \tag{1}$$

As one example, in a case where an oscillation wavelength of the quantum cascade laser element 2 is 4 μm to 16 μm and the groove-to-groove distance d is 4 μm to 10 μm (in other words, a groove density is 100 grooves/mm to 250 grooves/mm), the brazed angle θ is 20 degrees to 50 degrees. In this case, a groove depth h is 3 μm to 6 μm.

As shown in FIG. 3, the reflection layer 18 is provided on the resin layer 17 so as to cover the diffraction grating pattern 35. The reflection layer 18 is placed on a whole of a surface of the resin layer 17, the surface being on a side opposite to the insulating layer 16, for example. The reflection layer 18 is formed of a metal material such as titanium or gold, for example. The reflection layer 18 is formed so as to follow a shape of the diffraction grating pattern 35, and this portion functions as a reflection grating.

The stress regulation portion 19 is provided in a form of layers on the second surface 13b of the movable portion 13, and induces stress (bending stress) on the movable portion 13. In other words, the stress regulation portion 19 generates the stress in the movable portion 13. The stress regulation portion 19 includes a first layer 41 provided on the second surface 13b, and a second layer 42 provided on the first layer 41. Each of the first layer 41 and the second layer 42 is a silicon oxide film. A thickness of the first layer 41 is 0.5 μm or more and 2 μm or less, for example. A thickness of the second layer 42 is 0.1 μm or more and 3 μm or less, for example.

The first layer 41 is formed of a portion of the insulating layer 53, the portion being located on the pair of torsion bars 12 and the movable portion 13. That is, the first layer 41 is placed on a whole of the second surface 13b. The first layer 41 extends over the second surface 13b and surfaces of the respective torsion bars 12. The second layer 42 is placed on a whole surface of the first layer 41. The second layer 42 is provided so as to overlap the pair of torsion bars 12 and the movable portion 13 in a plan view.

[Shape of Movable Portion and the Like]

The first surface 13a of the movable portion 13 is caused to bend concavely (in other words, is warped) by stress which is induced on the movable portion 13 by the stress regulation portion 19. The first surface 13a has a shape which smoothly bends in a bowl shape as a whole, for example. That is, the first surface 13a is caused to bend concavely in both of a first cross section orthogonal to the center line X and a second cross section orthogonal to the first cross section. The second surface 13b is caused to bend convexly by stress which is induced on the movable portion 13 by the stress regulation portion 19. The second surface 13b is caused to bend convexly in both of the first cross section orthogonal to the center line X and the second cross section orthogonal to the first cross section, for example.

The movable portion 13 is caused to bend concavely so as to be recessed in a direction from the first surface 13a toward the second surface 13b (which will be hereinafter also referred to as a warping direction D), by stress induced on the movable portion 13 by the stress regulation portion 19. Accordingly, the insulating layer 16, the resin layer 17, the reflection layer 18, and the stress regulation portion 19 which are provided on the movable portion 13 similarly bend concavely so as to be recessed in the warping direction D.

Figure 5:
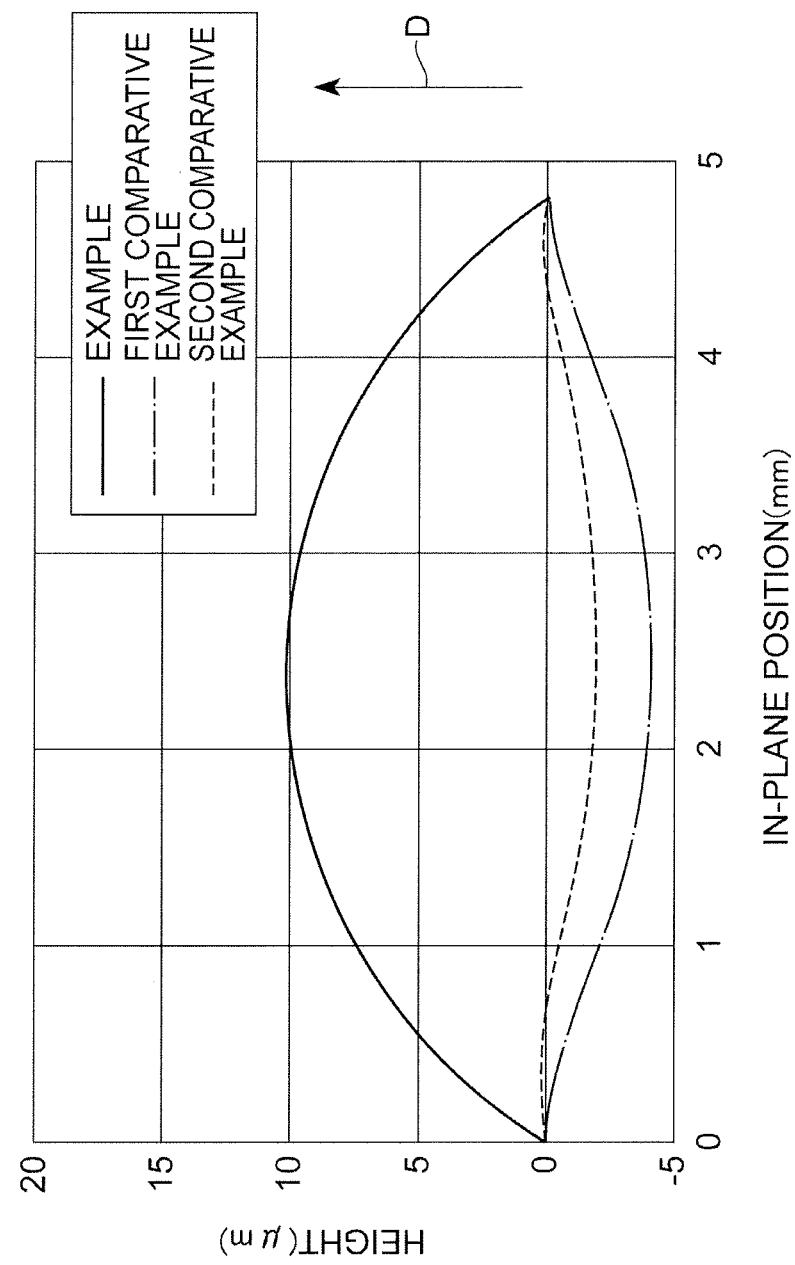
FIG. 5 is a graph showing a shape of a first surface in each of an example and comparative examples.

FIG. 5 is a graph showing a shape of the first surface 13a in each of an example, a first comparative example, and a second comparative example. The example corresponds to the movable diffraction grating 10 in the above-described embodiment. In the example, a thickness of the first layer 41 of the stress regulation portion 19 was set to 1 μm or slightly smaller, and a thickness of the second layer 42 was set to 1.5 μm. In the first comparative example, the second layer 42 was not provided. In the second comparative example, a thickness of the second layer 42 was set to 0.5 μm. Configurations of the first comparative example and the second comparative example in the other respects were set similarly to that in the example. FIG. 5 shows a relationship between an in-plane position (mm) and a height (μm) in the first cross section orthogonal to the center line X.

As shown in FIG. 5, in the first comparative example, the first surface 13a bent convexly. In the second comparative example, while a shape of the first surface 13a was closer to a flat shape than that in the first comparative example, the first surface 13a bent convexly at a central portion thereof. On the other hand, in the example, the first surface 13a bent concavely.

As appreciated by comparison between the first comparative example and the second comparative example, to provide the second layer 42 of the stress regulation portion 19 can induce stress on the movable portion 13 so that the first surface 13a bends concavely. Further, as appreciated by comparison between the example and the second comparative example, to increase a thickness of the second layer 42 of the stress regulation portion 19 can increase the stress. In the example (corresponding to the above-described embodiment), stress per unit thickness which is induced on the movable portion 13 by the first layer 41 is larger than stress per unit thickness which is induced on the movable portion 13 by the second layer 42. A total volume of stress which is induced on the movable portion 13 by the first layer 41 is larger than a total volume of stress which is induced on the movable portion 13 by the second layer 42.

The first surface 13a bent convexly in the first comparative example and the second comparative example for the following reasons. That is, because the movable portion 13, the insulating layer 16, the resin layer 17, and the reflection layer 18 are formed of different materials, and the coil 14, the wire 24, and the like which are formed of a metal material are provided in the movable portion 13 and the insulating layer 16, it is difficult to control stress which is generated in the movable portion 13 during manufacture. Also, it is difficult to control stress which is generated in the insulating layer 16 formed of a silicon oxide film. Further, stress generated in the resin layer 17 varies depending on a base layer, a coating condition, a curing condition, or the like. Accordingly, variation exists in stress which is generated during manufacture, so that the resin layer 17 (the first surface 13a) may have a shape which bends in various ways in some cases, in spite of efforts to form the resin layer 17 flat.

[Effects and Advantages]

As described above, in a case where the resin layer 17 is provided on the movable portion 13, the resin layer 17 may bend in various ways in some cases due to stress generated in the resin layer 17 itself, influences of a base layer, and the like. In such cases, the reflection layer 18 on the resin layer 17 also has a bending shape and cannot accurately diffract and reflect incident light. If such a movable diffraction grating is used as an external resonator of the external-resonator laser module 1, for example, an efficiency of diffraction may be probably reduced. In contrast, in the movable diffraction grating 10, the stress regulation portion 19 which induces stress on the movable portion 13 is provided, and the stress causes the first surface 13a to bend concavely. This makes it possible to certainly configure the resin layer 17 provided along the first surface 13a into a concavely-bending shape. As a result of this, incident light can be accurately diffracted and reflected, and when the movable diffraction grating 10 is used as an external resonator of the external-resonator laser module 1, for example, it is possible to suppress reduction in an efficiency of diffraction. More specifically, in a case where the resin layer 17 bends convexly, for example, reflected light spreads, so that an efficiency of diffraction is reduced. In contrast, in the movable diffraction grating 10, because the resin layer 17 bends concavely, spreading of reflected light can be suppressed, so that reduction in an efficiency of diffraction can be suppressed. Further, in the movable diffraction grating 10, the resin layer 17 bends concavely, and so influences of variation in a shape of the resin layer 17 (variation in a curvature, for example) upon spectral characteristics can be reduced.

In the movable diffraction grating 10, the stress regulation portion 19 is provided in a form of layers on the second surface 13b. Accordingly, it is possible to more preferably induce stress on the movable portion 13.

In the movable diffraction grating 10, the stress regulation portion 19 includes the first layer 41 provided on the second surface 13b and the second layer 42 provided on the first layer 41. Accordingly, it is possible to much more preferably induce stress on the movable portion 13.

In the movable diffraction grating 10, each of the first layer 41 and the second layer 42 is an oxide film. Accordingly, it is possible to form the second layer 42 uniformly on the first layer 41.

In the movable diffraction grating 10, stress which is induced on the movable portion 13 by the first layer 41 is larger than stress which is induced on the movable portion 13 by the second layer 42. Accordingly, by forming the second layer 42 on the first layer 41, it is possible to easily and certainly regulate a magnitude of stress which is induced on the movable portion 13, and consequently, it is possible to easily and certainly cause the first surface 13a to bend in a desired concave form.

In the movable diffraction grating 10, the diffraction grating pattern 35 is a blazed grating pattern which includes the plurality of grooves 35a each extending along a direction parallel to the center line X on which the movable portion 13 swings. Accordingly, by causing the movable portion 13 to swing, it is possible to make a wavelength of light returning back to the quantum cascade laser element 2 from the movable diffraction grating 10, variable.

The movable diffraction grating 10 includes the torsion bars 12 which extend along the center line X and connect the supporting portion 11 and the movable portion 13 with each other. Accordingly, by causing the movable portion 13 to swing, it is possible to make a wavelength of light returning back to the quantum cascade laser element 2 from the movable diffraction grating 10, variable.

In the movable diffraction grating 10, the first surface 13a is caused to bend concavely in the first cross section orthogonal to the center line X. Accordingly, it is possible to more certainly suppress spreading of reflected light.

In the movable diffraction grating 10, the first surface 13a is caused to bend concavely in both of the first cross section and the second cross section orthogonal to the first cross section. Accordingly, it is possible to much more certainly suppress spreading of reflected light.

In the movable diffraction grating 10, the movable portion 13 may have a circular shape in a plan view. Accordingly, it is possible to easily and certainly cause the first surface 13a to bend in a desired concave form. That is, in a case where the movable portion 13 has a circular shape in a plan view, it is possible to easily and certainly cause the first surface 13a to bend concavely in both of the first cross section and the second cross section.

In the movable diffraction grating 10, the second surface 13b is caused to bend convexly by stress which is induced by the stress regulation portion 19. Accordingly, it is possible to easily and certainly cause the first surface 13a to bend in a desired concave form.

In the movable diffraction grating 10, the coil 14 is buried in the movable portion 13. Accordingly, the movable portion 13 can be made thinner, and the movable portion 13 is allowed to swing fast and at a large swinging angle. Further, because the coil 14 is buried in the movable portion 13, a larger thickness of the coil 14 is secured as compared to a case where the coil 14 is provided on the movable portion 13, for example, so that resistance of the coil 14 can be reduced. Reduction in resistance of the coil 14 suppresses generation of heat in the coil 14, so that deformation of the reflection layer 18 due to heat transfer from the coil 14 can be suppressed.

In the movable diffraction grating 10, the diffraction grating pattern 35 is formed in the resin layer 17 and the reflection layer 18 is provided on the resin layer 17 and along the diffraction grating pattern 35. Accordingly, the resin layer 17 is placed between the movable portion 13 and the reflection layer 18, so that heat transfer from the coil 14 to the reflection layer 18 can be suppressed and heat dissipation from a surface (the second surface 13b) of the movable portion 13, the surface being on a side opposite to the reflection layer 18, can be promoted. As a result of this, deformation of the reflection layer 18 due to heat transfer from the coil 14 can be further suppressed and degradation of optical characteristics due to thermal deformation can be suppressed.

In the movable diffraction grating 10, the diffraction grating pattern 35 is a blazed grating pattern which diffracts light of wavelengths in a mid-infrared region. Accordingly, a high efficiency of diffraction can be attained. Further, a blazed grating for wavelengths in a mid-infrared region includes the groove 35a which is deeper than that of a grating for shorter wavelengths than wavelengths in a mid-infrared region, so that influences of deformation of the reflection layer 18 upon an efficiency of diffraction can be reduced.

In the movable diffraction grating 10, the resin layer 17 is formed of an ultraviolet curable resin. Thus, as compared to a case where the resin layer 17 is formed of a thermosetting resin, for example, heat transfer from the coil 14 to the reflection layer 18 can be further suppressed and heat dissipation from a surface of the movable portion 13, the surface being on a side opposite to the reflection layer 18, can be further promoted. Further, the resin layer 17 is resistant to deterioration from aging and is superior in durability, so that reliability of the movable diffraction grating 10 is enhanced.

In the external-resonator laser module 1, the movable diffraction grating 10 functions as an external resonator, so that light of a specific wavelength can be amplified and output to the outside. Further, by causing the movable portion 13 of the movable diffraction grating 10 to swing and changing an orientation of a grating surface, it is possible to change a wavelength of output light quickly. Thus, to use the external-resonator laser module 1 as a light source for analysis of a concentration of a gas, for example, makes it possible to carry out analysis of various kinds of gases with a single light source, and shorten a time for analysis.

[Manufacturing Method for Movable Diffraction Grating]

Figure 6:
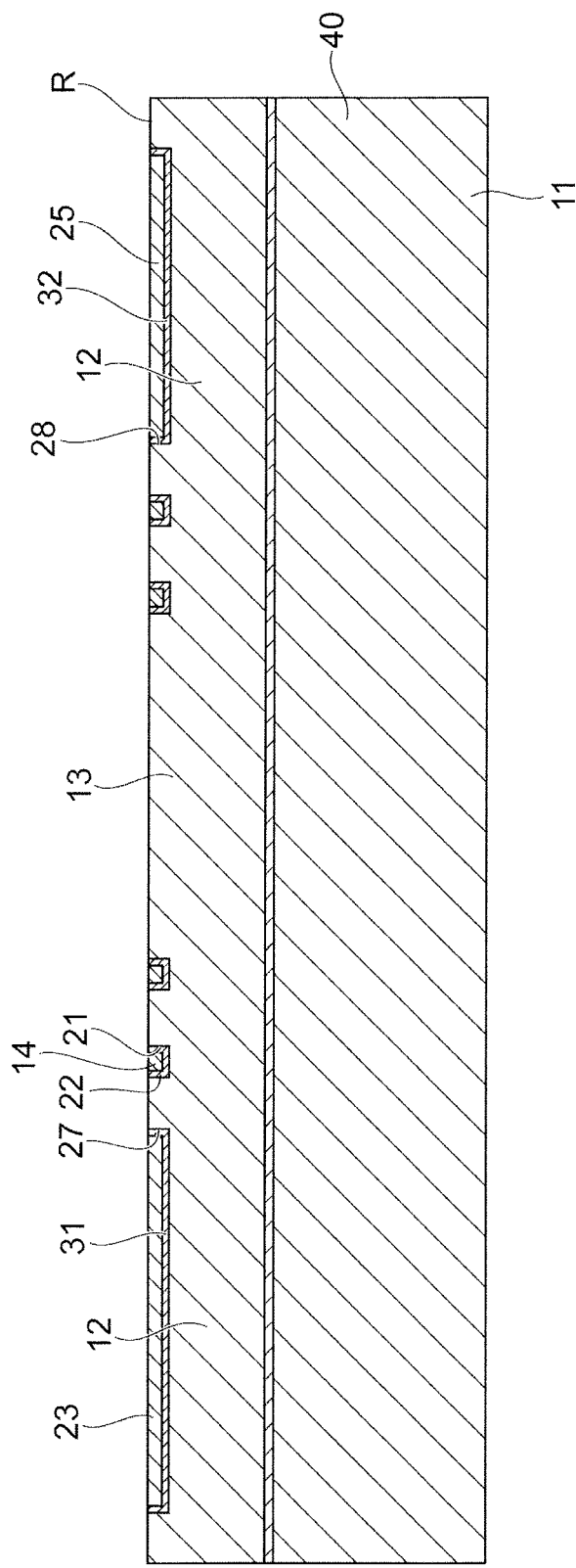
FIG. 6 is a view for explaining a manufacturing method for the movable diffraction grating shown in FIG. 2.
Figure 7:
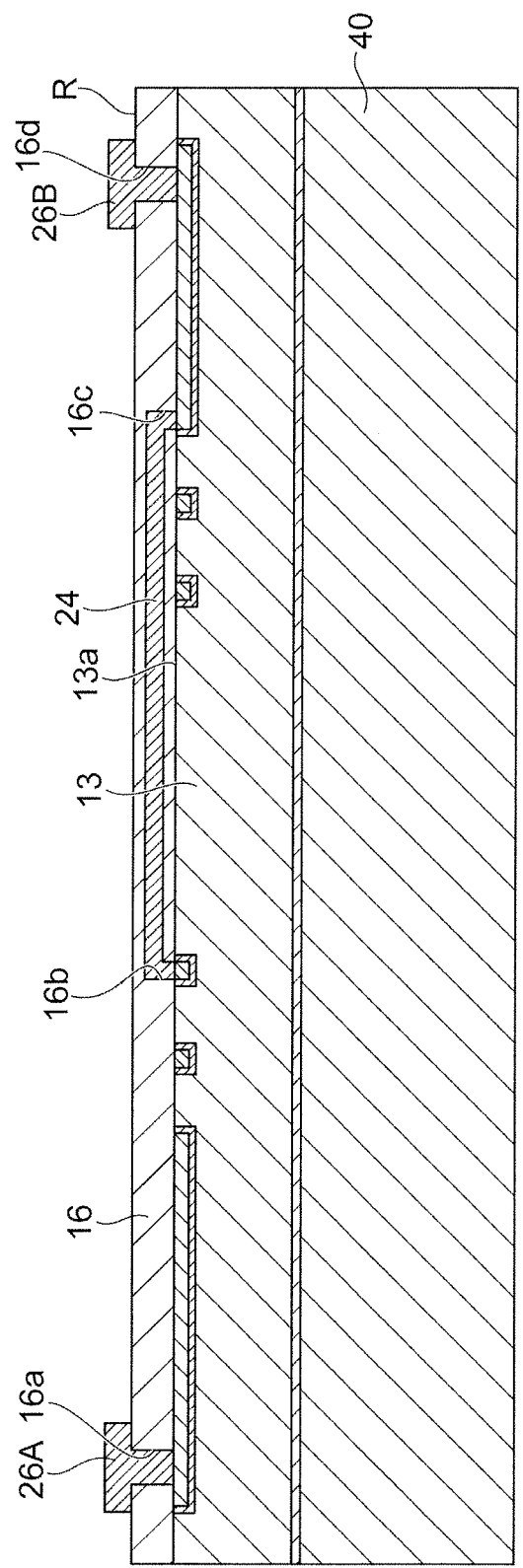
FIG. 7 is a view for explaining the manufacturing method for the movable diffraction grating shown in FIG. 2.

Next, one example of a manufacturing method for the movable diffraction grating 10 will be described with reference to FIGS. 6 to 12B. First, as shown in FIGS. 6 to 8, a wafer 40 including portions R corresponding to the supporting portion 11, the pair of torsion bars 12, and the movable portion 13 is prepared, and the insulating layer 16, the resin layer 17, and the reflection layer 18 are formed (a first step). In FIGS. 6 to 8, the first cross section orthogonal to the center line X is shown.

The wafer 40 is an SOI substrate, for example, and includes a plurality of portions R placed so as to be adjacent to each other. In this case, each of processing steps described below is performed on the respective portions R at the same time. Then, the wafer 40 after processed is etched along a boundary (dicing line) between the portions R, so that the substrate 50 separated from the wafer 40 is obtained. The etching at that time is performed at the same time as etching for separating the movable portion 13 from a periphery, for example. In the following description, one of the portions R will be focused on.

In the first step, first, the grooves 21, 27, and 28 are formed in a surface of the portion R by etching. Subsequently, the insulating layers 22, 31, and 32 are formed on inner surfaces of the grooves 21, 27, and 28 by thermal oxidation of the inner surfaces of the grooves 21, 27, and 28. Subsequently, a seed layer is formed on each of the insulating layers 22, 31, and 32 in the grooves 21, 27, and 28 by sputtering. Subsequently, the coil 14 and the wires 23 and 25 are formed so as to be buried in the grooves 21, 27, and 28, by plating. Subsequently, surfaces of the coil 14 and the wires 23 and 25 are flattened so as to be flush with a surface of the wafer 40, by chemical mechanical polishing (CMP).

Subsequently, as shown in FIG. 7, the insulating layer 16 is formed on the first surface 13a of the movable portion 13. In this step, first, a part of the insulating layer 16, the part contributing to a partial thickness of the insulating layer 16, is formed on surfaces of the supporting portion 11, the pair of torsion bars 12, and the movable portion 13, by chemical vapor deposition (CVD). Subsequently, contact holes corresponding to the openings 16a to 16d are formed in the part of the insulating layer 16 by etching. Subsequently, the wire 24 is formed on the part of the insulating layer 16 by sputtering. Subsequently, a remaining part of the insulating layer 16 is formed on the part of the insulating layer 16 by CVD. Subsequently, contact holes corresponding to the openings 16a and 16d are formed in the insulating layer 16 by etching. Subsequently, the electrodes 26A and 26B are formed on the insulating layer 16 by sputtering. By the above-described steps, the insulating layer 16 with the electrodes 26A and 26B and the wire 24 is formed.

Subsequently, a resin material having ultraviolet curability is placed on the insulating layer 16 (FIG. 8). In this step, first, a layer of a resin material is formed uniformly on an area in a surface of the insulating layer 16, the area including the movable portion 13 in a plan view, by spin coating. Thus, at that time, the resin material includes a portion which is located outside of the movable portion 13 in a plan view.

Subsequently, with the use of a mold including a transfer pattern corresponding to the diffraction grating pattern 35, the transfer pattern is transferred to the resin material, so that the resin layer 17 in which the diffraction grating pattern 35 is formed, is formed. In this step, the resin material is irradiated with ultraviolet rays through the mold while brought into intimate contact with the mold which is transparent to ultraviolet rays, for example, so that the diffraction grating pattern 35 is formed in the resin material. Such a mold as described is manufactured by the following steps, for example. First, the blazed diffraction grating pattern 35 which is inclined is formed in a silicon substrate having a high-index plane such as a (311) plane, by anisotropic etching, so that a master is manufactured. Subsequently, with the use of the master, a mold of an ultraviolet-transparent resin which includes a transfer pattern corresponding to the diffraction grating pattern 35 is replicated. By those steps, the above-described mold is obtained.

Subsequently, the reflection layer 18 is formed on the resin layer 17 so as to lie along the diffraction grating pattern 35, by sputtering, vapor deposition, or the like, for example. Subsequently, the resin material is patterned by etching, so that a part of the resin material, the part being located outside of the first surface 13a in the movable portion. 13 in a plan view (that is, a part other than the resin layer 17), is removed. By the above-described steps, the resin layer 17 and the reflection layer 18 are formed on the insulating layer 16 as shown in FIG. 8.

Subsequently, as shown in FIGS. 9A to 12B, the stress regulation portion 19 is formed to induce stress on the movable portion 13, so that the first surface 13a is caused to bend concavely (a second step). In FIGS. 9A, 10A, 11A, and 12A, the first cross section orthogonal to the center line X is shown, and in FIGS. 9B, 10B, 11B, and 12B, the second cross section orthogonal to the first cross section is shown.

In the second step, first, the insulating layer 16 except parts which are located on the supporting portion 11, the pair of torsion bars 12, and the movable portion 13 is removed by etching, as shown in FIGS. 9A and 9B. Subsequently, as shown in FIGS. 10A and 10B, the semiconductor layer 51 is etched with the insulating layer 53 being used as an etching stop layer, so that the semiconductor layer 51 except parts which form the supporting portion 11, the pair of torsion bars 12, and the movable portion 13 is removed. As a result, a part of the insulating layer 53 is exposed. Subsequently, the exposed part of the insulating layer 53 is removed by etching.

Figure 11A:
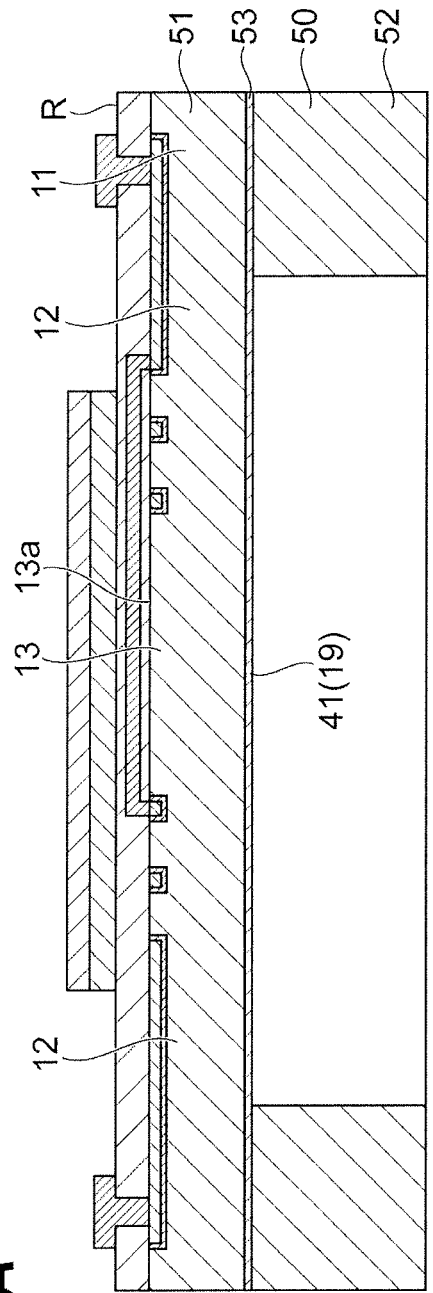
FIGS. 11A and 11B are views for explaining the manufacturing method for the movable diffraction grating shown in FIG. 2.
Figure 11B:
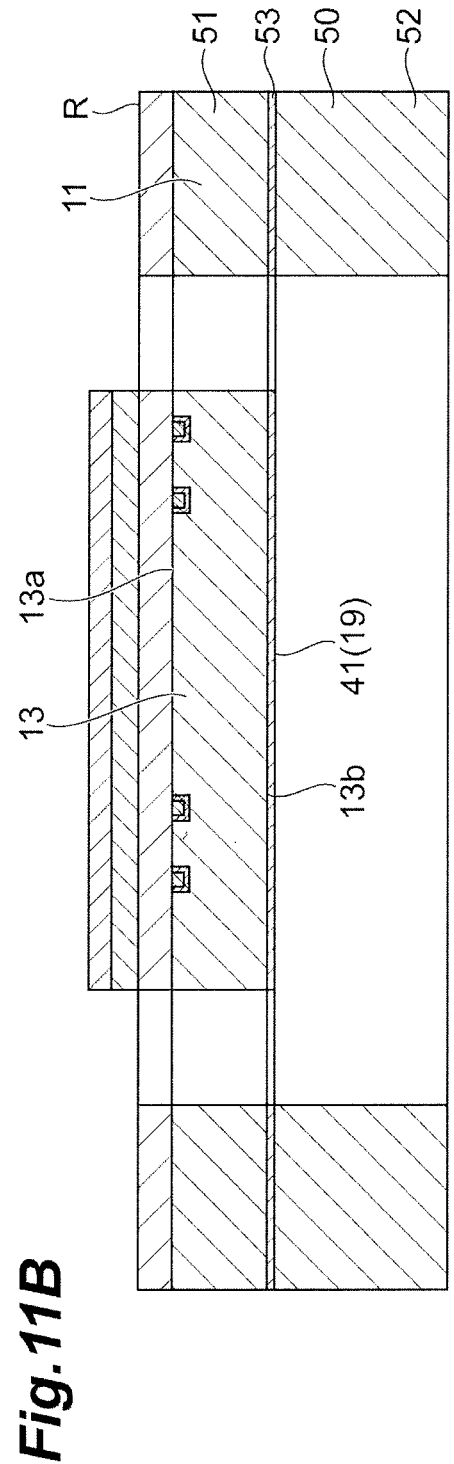

Subsequently, as shown in FIGS. 11A and 11B, the semiconductor layer 52 is etched with the insulating layer 53 being used as an etching stop layer, so that the semiconductor layer 52 except a part which forms the supporting portion 11 is removed. As a result, the insulating layer 53 which is located on the pair of torsion bars. 12 and the movable portion 13 is left, and the first layer 41 of the stress regulation portion 19 is formed. In other words, in the second step, etching is performed in such a manner that a part of the insulating layer 53 is left and the rest of the insulating layer 53 is removed, so that the first layer 41 is formed.

Figure 12A:
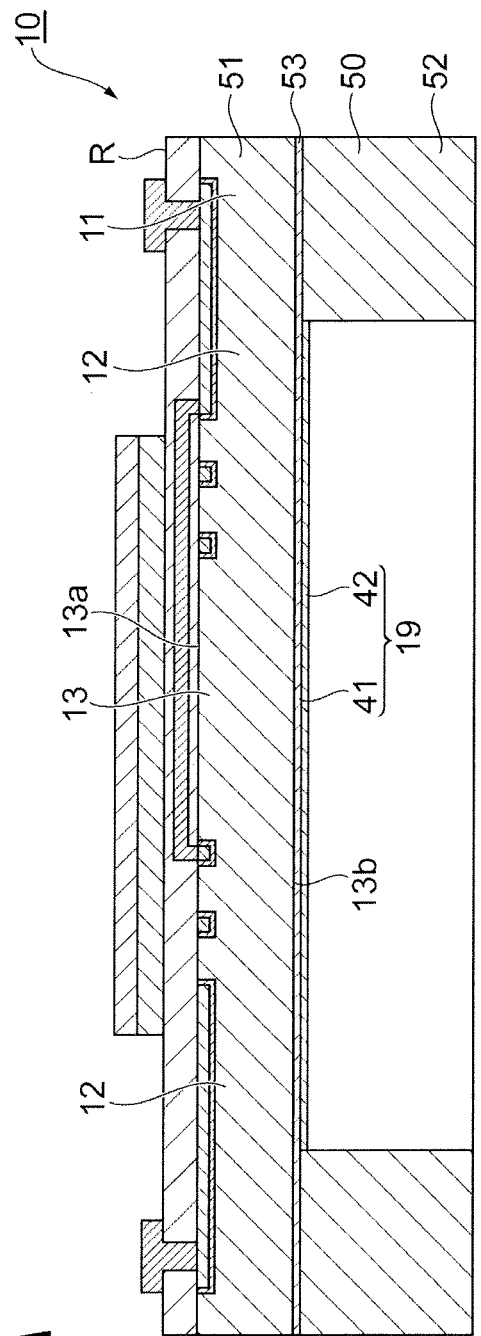
FIGS. 12A and 12B are views for explaining the manufacturing method for the movable diffraction grating shown in FIG. 2.
Figure 12B:
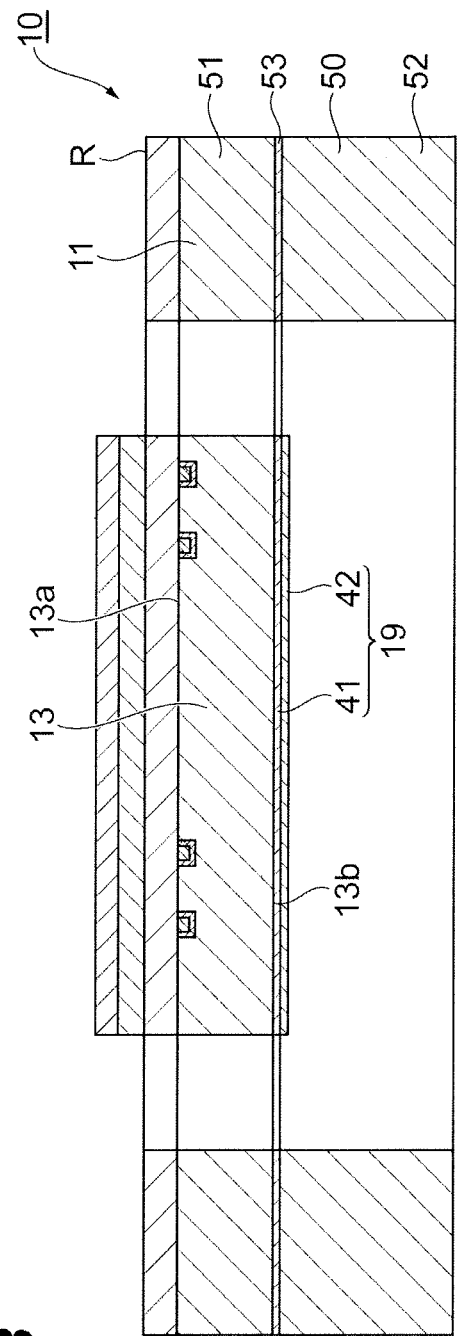

As described above, the wafer 40 is etched along a dicing line at the same time as etching of the semiconductor layer 52. Accordingly, the substrate 50 separated from the wafer 40 is obtained. Subsequently, as shown in FIGS. 12A and 12B, the second layer 42 is formed on the first layer 41 by sputtering. Because of formation of the first layer 41 and the second layer 42, stress is induced on the movable portion 13 and the first surface 13a is caused to bend concavely. By the above-described steps, the movable diffraction grating 10 is obtained.

[Effects and Advantages]

In the above-described manufacturing method for the movable diffraction grating 10, because the stress regulation portion 19 is formed and the first surface 13a is caused to bend concavely after formation of the resin layer 17 and the reflection layer 18, the first surface 13a can be certainly caused to bend in a desired concave form.

In the manufacturing method for the movable diffraction grating 10, the second layer 42 of the stress regulation portion 19 is Banned by sputtering. Accordingly, the second layer 42 which is highly dense can be formed, and stress can be more preferably induced on the movable portion 13. Further, because sputtering can be performed at a low temperature, influences of formation of the second layer 42 upon the resin layer 17 can be reduced.

In the manufacturing method for the movable diffraction grating 10, etching is performed in such a manner that a part of the insulating layer 53 is left and the rest of the insulating layer 53 is removed, so that the first layer 41 of the stress regulation portion 19 is formed. Thus, it is possible to form the first layer 41 by leaving a part of the insulating layer 53 included in the substrate 50.

In the manufacturing method for the movable diffraction grating 10, the insulating layer 53 is used as an etching stop layer when the semiconductor layers 51 and 52 are etched. Thus, by causing the insulating layer 53 to function as an etching stop layer, it is possible to preferably etch the semiconductor layers 51 and 52. Further, it is possible to form the first layer 41 of the stress regulation portion 19 by leaving a part of the insulating layer 53 which functions as an etching stop layer.

In the manufacturing method for the movable diffraction grating 10, the diffraction grating pattern 35 which is highly accurate can be easily formed. More specifically, although it is conceivable to form the diffraction grating pattern 35 in the insulating layer 16, for example, it is extremely difficult to accurately form a pattern on the order of micrometers such as the diffraction grating pattern 35, in the insulating layer 16 formed of a silicon oxide film. Also, it is difficult to accurately form a silicon oxide film with a thickness of several micrometers. Those matters are especially noticeable in a case where the diffraction grating pattern 35 diffracts light of wavelengths in a mid-infrared region and the groove 35a of the diffraction grating pattern 35 is deep, as in the present embodiment. In contrast, in the manufacturing method for the movable diffraction grating 10, a transfer pattern corresponding to the diffraction grating pattern 35 is transferred to a resin material with the use of a mold including the transfer pattern, so that the resin layer 17 in which the diffraction grating pattern 35 is formed is formed. Accordingly, the diffraction grating pattern 35 which is highly accurate can be easily formed and flexibility in design of the diffraction grating pattern 35 can be improved.

While one embodiment of the present disclosure has been described hereinabove, an aspect of the present disclosure is not limited to the above-described embodiment. The stress regulation portion 19 may be configured in any way that allows stress to be induced on the movable portion 13 so that the first surface 13a bends concavely. For example, the stress regulation portion 19 may include a beam portion which is formed by partial lightening of a portion of the movable portion 13, the portion being located on the second surface 13b side. The stress regulation portion 19 may include an ion implantation portion which is formed by ion implantation into a portion of the movable portion 13, the portion being located on the second surface 13b side. At least a part of the stress regulation portion 19 may be formed of nitride, oxide, fluoride, metal, or the like.

Though the first layer 41 of the stress regulation portion 19 is provided on the torsion bars 12 and the movable portion 13 in the above-described embodiment, the first layer 41 may be provided only on the movable portion 13. The first layer 41 may be placed on a part of the second surface 13b of the movable portion 13, not a whole of the second surface 13b. The second layer 42 may be formed on a part of the first layer 41, not a whole surface of the first layer 41. Only one of the first layer 41 and the second layer 42 may be provided. In a case where the first layer 41 is omitted, the substrate 50 is not necessarily required to be an SOI substrate, and may be a silicon substrate. Another layer may be provided on the stress regulation portion 19, or another layer may be provided between the stress regulation portion 19 and the second surface 13b. In other words, the stress regulation portion 19 may be provided on the second surface 13b with another layer interposed therebetween. The stress regulation portion 19 may be omitted. In this case, the first surface 13a may be caused to bend concavely by stress induced on the movable portion 13, or may bend concavely without stress induced on the movable portion 13.

In the above-described embodiment, in addition to the movable portion 13 (in other words, a first movable portion) which swings on the center line X (in other words, a first center line), a second movable portion which swings on a second center line orthogonal to the first center line may be provided. In this case, the second movable portion is formed in a shape of a frame and is placed so as to surround the first movable portion. The first movable portion is swingably connected with the second movable portion via a pair of first torsion bars. The second movable portion is swingably connected with the supporting portion 11 via a pair of second torsion bars. In the second movable portion, a coil for driving the second movable portion is provided. With such a configuration, not only can the first movable portion be caused to swing on the first center line, but also the first movable portion can be caused to swing on the second center line by swinging of the second movable portion on the second center line. Meanwhile, a coil may be provided only in the second movable portion (in other words, the supporting portion) while no coil is provided in the first movable portion. In this case, the first movable portion may be caused to swing by a driving force of a coil on the second movable portion.

Although the movable diffraction grating 10 electromagnetically driven is shown as an example in the above-described embodiment, the movable diffraction grating 10 may be piezoelectrically driven, electrostatically driven, or driven in the other like manner. For example, a driving portion for driving the movable portion 13 may be formed of a piezoelectric film (in other words, a piezoelectric element) provided in the movable portion 13, or may be formed of a fixed comb electrode provided in the supporting portion 11 and a movable comb electrode provided in the movable portion 13.

In the above-described embodiment, the first surface 13a may bend concavely in only one of the first cross section and the second cross section. In this case, a shape of the first surface 13a in the other of the first cross section and the second cross section may be flat, for example. A shape of the movable portion 13 in a plan view may be any shape such as a rectangular shape, an oval shape, or a diamond shape.

The coil 14 may be provided on the first surface 13a, instead of being buried in the first surface 13a of the movable portion 13. Or, the coil 14 may be buried in the second surface 13b, or provided on the second surface 13b. The diffraction grating pattern 35 is not necessarily required to diffract light of wavelengths in a mid-infrared region, and may be configured to diffract light of any wavelength. The diffraction grating pattern 35 may be a binary grating having a rectangular cross section, a holographic grating having a sine-wave-shaped cross section, or the like.

In the above-described manufacturing method for the movable diffraction grating 10, steps for etching the insulating layer 53 in such a manner that a part of the insulating layer 53, the part forming the first layer 41, is left, are not limited to the above-described example. A part of the steps may be omitted, or the order of the steps may be changed. For example, an exposed part of the insulating layer 53 may be left unremoved immediately after etching of the semiconductor layer 51, and the part of the insulating layer 53 may be removed after etching of the semiconductor layer 52. Or, the semiconductor layer 51 may be etched after etching of the semiconductor layer 52, and thereafter, etching may be performed in such a manner that a part of the insulating layer 53, the part forming the first layer 41, is left and the rest of the insulating layer 53 is removed. In the above-described manufacturing method for the movable diffraction grating 10, the substrate 50 may be separated from the wafer 40 by a method other than etching. For example, the wafer 40 may be cut by a method in which a modified region is formed along a dicing line in the wafer 40 by laser irradiation and a crack is allowed to extend along a thickness of the wafer 40 from the modified region by a tape-expanding process or the like.

What is claimed is:

1. A movable diffraction grating comprising:
   a supporting portion;
   a movable portion including a first surface and swingably connected with the supporting portion;
   a resin layer in which a diffraction grating pattern is formed, the resin layer being provided on the first surface;
   a reflection layer provided on the resin layer and along the diffraction grating pattern, the reflection layer being formed of metal; and
   a stress regulation portion inducing stress on the movable portion, wherein
   the first surface is caused to bend concavely by the stress.

2. The movable diffraction grating according to claim 1, wherein
   the stress regulation portion is provided in a form of layer on a second surface that is opposed to the first surface.

3. The movable diffraction grating according to claim 1, wherein
   the stress regulation portion includes a first layer provided on a second surface that is opposed to the first surface, and a second layer provided on the first layer.

4. The movable diffraction grating according to claim 3, wherein
   each of the first layer and the second layer is an oxide film.

5. The movable diffraction grating according to claim 3, wherein
   stress per unit thickness that is induced on the movable portion by the first layer is larger than stress per unit thickness that is induced on the movable portion by the second layer.

6. The movable diffraction grating according to claim 1, wherein
   the diffraction grating pattern is a blazed grating pattern including a plurality of grooves each of which extends along a direction parallel to a center line on which the movable portion swings.

7. The movable diffraction grating according to claim 6, further comprising
   a torsion bar extending along the center line and connecting the supporting portion and the movable portion with each other.

8. The movable diffraction grating according to claim 1 wherein
   the first surface is caused to bend concavely in a first cross section orthogonal to a center line on which the movable portion swings.

9. The movable diffraction grating according to claim 8, wherein
   the first surface is caused to bend concavely in a second cross section orthogonal to the first cross section.

10. The movable diffraction grating according to claim 1, wherein
    the movable portion has a circular shape when seen from a direction orthogonal to the first surface.

11. The movable diffraction grating according to claim 1, wherein
a second surface that is opposed to the first surface is caused to bend convexly by the stress induced by the stress regulation portion.

12. An external-resonator laser module comprising
the movable diffraction grating according to claim 1; and
a laser element, wherein
the movable diffraction grating that diffracts and reflects light oscillated by the laser element so that light of a specific wavelength in the light is returned back to the laser element.

13. A manufacturing method for the movable diffraction grating according to claim 1, comprising:
a first step of preparing a substrate including a portion corresponding to the supporting portion and the movable portion, and forming the resin layer and the reflection layer; and
a second step of forming the stress regulation portion and inducing the stress on the movable portion, to cause the first surface to bend concavely, after the first step.

14. The manufacturing method for the movable diffraction grating according to claim 13, wherein
in the second step, at least a part of the stress regulation portion is formed by sputtering.

15. The manufacturing method for the movable diffraction grating according to claim 13, wherein
the substrate includes a semiconductor layer and an insulating layer, and
in the second step, etching is performed in such a manner that a part of the insulating layer is left and the rest of the insulating layer is removed, so that at least a part of the stress regulation portion is formed.

16. The manufacturing method for the movable diffraction grating according to claim 15, wherein
in the second step, the insulating layer is used as an etching stop layer when the semiconductor layer is etched.

* * * * *